US012432560B2

(12) United States Patent
Andreina et al.

(10) Patent No.: US 12,432,560 B2
(45) Date of Patent: Sep. 30, 2025

(54) METHOD AND SYSTEM FOR SCALING BLOCKCHAINS VIA SECURE CHAIN DIVISION (71) Applicant: NEC Laboratories Europe GmbH, Heidelberg (DE)

(72) Inventors: Sebastien Andreina, Heidelberg (DE); Giorgia Azzurra Marson, Heidelberg (DE); Lorenzo Alluminio, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 18/038,042

(22) PCT Filed: Apr. 22, 2021

(86) PCT No.: PCT/EP2021/060566
§ 371 (c)(1),
(2) Date: May 22, 2023

(87) PCT Pub. No.: WO2022/161646
PCT Pub. Date: Aug. 4, 2022

(65) Prior Publication Data
US 2024/0007857 A1 Jan. 4, 2024

(30) Foreign Application Priority Data

Jan. 29, 2021 (EP) .................................. 21154276

(51) Int. Cl.
*H04W 12/086* (2021.01)
*H04B 7/185* (2006.01)
(52) U.S. Cl.
CPC ...... *H04W 12/086* (2021.01); *H04B 7/18519* (2013.01)

(58) Field of Classification Search
CPC ......................... H04W 12/086; H04B 7/18519
(Continued)

(56) References Cited

U.S. PATENT DOCUMENTS

2019/0251187 A1 8/2019 Lin
2019/0303353 A1* 10/2019 Letz ..................... H04L 9/3239
(Continued)

FOREIGN PATENT DOCUMENTS

GB 2571927 A * 9/2019 ........... G06Q 20/065
JP 2019-212044 A 12/2019
(Continued)

OTHER PUBLICATIONS

Yigo, Abdoul-Nourou et al.; "Practicability of Blockchain Technology and Scalable Blockchain Network: Sharding"; *Master of Science—Computer Science*; Dec. 1, 2019; pp. 1-106; XP055725953; University of Wisconsin—Whitewater; Whitewater, WI, USA.
(Continued)

*Primary Examiner* — Zi Ye
(74) *Attorney, Agent, or Firm* — Leydig, Voit & Mayer, Ltd.

(57) ABSTRACT

A method for secure chain division of a satellite chain by a validator node of a permission-based blockchain system includes executing, by communicating with a set of validator nodes of an original satellite chain of the blockchain system, a validator assignment scheme that splits the set of validator nodes of the original satellite chain into subsets of validator nodes of child chains of the original satellite chain, and running, by communicating with the validator nodes of the respective subsets, a reconfiguration protocol to set up the respective child chains and sending, to an identity management component that maintains identity information of all members of the blockchain system in a registry, a configuration update to record the division of the original
(Continued)

satellite chain and corresponding creation of the child chains.

10 Claims, 4 Drawing Sheets

(58) Field of Classification Search
USPC .......................................................... 726/30
See application file for complete search history.

(56) References Cited

U.S. PATENT DOCUMENTS

| | | |
|---|---|---|
| 2019/0372825 A1 | 12/2019 | Suga |
| 2020/0034334 A1* | 1/2020 | Lu .......................... H04L 9/0637 |
| 2021/0044422 A1* | 2/2021 | Lu .......................... H04L 9/3239 |
| 2021/0264051 A1 | 8/2021 | Koide |

FOREIGN PATENT DOCUMENTS

| | | |
|---|---|---|
| WO | WO 2019/142049 A1 | 7/2019 |
| WO | WO 2020/003386 A1 | 1/2020 |
| WO | WO 2020/244514 A1 | 12/2020 |

OTHER PUBLICATIONS

Wenting Li et al. Towards Scalable and Private Industrial Blockchains BCC '17: Proceedings of the ACM Workshop on Blockchain, Cryptocurrencies and Contracts, Apr. 2, 2017, UAE, pp. 9-14.

* cited by examiner

METHOD AND SYSTEM FOR SCALING BLOCKCHAINS VIA SECURE CHAIN DIVISION

CROSS REFERENCE TO RELATED APPLICATIONS

This application is a U.S. National Phase application under 35 U.S.C. § 371 of International Application No. PCT/EP2021/060566, filed on Apr. 22, 2021, and claims benefit to European Patent Application No. EP 21154276.6, filed on Jan. 29, 2021. The International Application was published in English on Aug. 4, 2022 as WO 2022/161646 A1 under PCT Article 21(2).

FIELD

The present invention relates to a method for secure chain division of a satellite chain by a validator node of a permission-based blockchain system as well as to a validator node of a permission-based blockchain system.

BACKGROUND

Permission-based blockchains offer strong security, in the sense of ensuring consistency and liveness of the system even in the presence of an attacker controlling a number of Byzantine participants, and high performance in terms of transaction throughput. However, the scalability of permission-based blockchains is limited in that their underlying BFT consensus protocols become largely inefficient as the number of participants increases.

There have been several proposals in the blockchain domain to increase transaction throughput via parallelism, the most prominent of these being blockchain sharding. Various different designs for blockchain sharding exists, however, all of them are based on the same high-level idea: to operate multiple blockchains (so-called shards) "in parallel", under the same consensus protocol, so that different subsets of validators are responsible for different shards. Importantly, each shard must operate in coordination with all other shards, using the same consensus protocol and sharing the same policies. While sharding can be suitably applied to improve the performance of an individual blockchain, its rigid design makes it inapplicable to scenarios where multiple blockchains coexist and operate autonomously.

SUMMARY

In an embodiment, the present disclosure provides a method for secure chain division of a satellite chain by a validator node of a permission-based blockchain system. The method includes executing, by communicating with a set of validator nodes of an original satellite chain of the blockchain system, a validator assignment scheme that splits the set of validator nodes of the original satellite chain into subsets of validator nodes of child chains of the original satellite chain, and running, by communicating with the validator nodes of the respective subsets, a reconfiguration protocol to set up the respective child chains and sending, to an identity management component that maintains identity information of all members of the blockchain system in a registry, a configuration update to record the division of the original satellite chain and corresponding creation of the child chains.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention improves and further develops a method and a validator node of the initially described type in such a way that a high throughput of the blockchain system can be preserved in a secure and flexible way even in case of an increasing number of participants.

In another embodiment, the present invention provides a method for secure chain division of a satellite chain by a validator node of a permission-based blockchain system, the method comprising: executing, by communicating with a set of validator nodes of an original satellite chain of the blockchain system, a validator assignment scheme that splits the validator nodes of the original satellite chain into subsets of validator nodes of child chains of the original satellite chain; and running, by communicating with the validator nodes of the respective subsets, a reconfiguration protocol to set up the respective child chains and sending, to an identity management component that maintains identity information of all members of the blockchain system in a registry, a configuration update to record the division of the original satellite chain and corresponding creation of the child chains.

In another embodiment, the present invention provides a validator node of a permission-based blockchain system, comprising a processor and a memory, the memory comprising processor executable instructions that, when executed by the processor, cause the processor to perform the following operations for secure chain division of a satellite chain in the blockchain system: executing, by communicating with a set of validator nodes of an original satellite chain of the blockchain system, a validator assignment scheme that splits the validator nodes of the original satellite chain into subsets of validator nodes of child chains of the original satellite chain; and running, by communicating with the validator nodes of the respective subsets, a reconfiguration protocol to set up the respective child chains and sending, to an identity management component that maintains identity information of all members of the blockchain system in a registry, a configuration update to record the division of the original satellite chain and corresponding creation of the child chains.

The present invention provides a secure chain division mechanism for turning a permission-based blockchain into two autonomous blockchains in a way that preserves Byzantine resilience. The invention enables the creation of multiple high-performant blockchains that operate autonomously while letting clients transact with each other through cross-chain transactions, therefore meeting high levels of interoperability. As such, embodiments of the present invention target applications where multiple blockchains co-exist and operate autonomously, and yet have the option of interacting with each other via cross-chain communication. The present invention therefore provides a more flexible solution than existing solutions, e.g. sharding, and can be suited to various use-cases in the context of interoperable blockchains.

More specifically, embodiments of the present invention provide a method for securely splitting a blockchain system to create two "child" blockchains, so that safety and liveness are guaranteed for both child systems despite Byzantine failures. Embodiments of the invention can find application in permission-based blockchain systems for large-scale deployment. Chain division leverages parallelism to scale permission-based blockchains with dynamic membership (i.e., participants can join and leave at any time): it allows increasing the number of participants arbitrarily while preserving the high throughput of a small-scale system. Embodiments of the invention enable the various blockchains to communicate with each other, and support asset transfer across blockchains, therefore meeting high standards for blockchain interoperability.

In an embodiment, the invention provides a method to improve throughput of (populous) blockchains through chain-splitting, effectively separating them into multiple chains by secure division of chains. The method may include setting up an identity management system (IAM) and initializing a registry for storing information about various permission based block chains. Subsequent to IAM setup, the method may include construction and registration of a new blockchain in the identity management system along with validator access policies and condition triggers for splitting the chain. The method may further include splitting the generated blockchain into multiple child blockchains upon occurrence of an event that triggers established conditions and submitting a division update to the identity management system.

The method may also include cross-chain transferring of assets between the child chains using a chain proof, where assets at a source child chain are locked and transferred to a destination chain upon verification of a generated chain proof. In this context, embodiments of the invention enable trustless cross chain transfer between each resulting chain and providing trustless bootstrap for newly joining nodes. The method may also include re-validation of transfer using an acknowledgment receipt received from the destination chain. In case acknowledgement is positive, assets are permanently deleted from the source chain, and in case of negative acknowledgement, assets are unlocked at the source chain.

According to an embodiment of the invention, a chain division process performed by the validators VS of a chain S may include the following steps:
1. Upon observing an event that triggers the conditions for chain splitting:
   1.1. Split set $V_S$ into $V_{S1}$ and $V_{S2}$ according to a suitable validator-assignment scheme.
   1.2. Run a reconfiguration protocol to set up chains $S_1$ and $S_2$ consistently with S (and setting up proper configuration for each of the chains).
2. Send a configuration update to an IM that records the configuration of existing chains for registering the chain division of S into chains $S_1$ and $S_2$.

According to an embodiment of the invention, a cross-chain asset transfer involving a client and two satellite chains $S_1$ and $S_2$ (which may result from a chain division process as specified above) may include the following steps:
1. Upon reception of a cross-chain transfer request from a client, the validators of the source chain $S_1$ lock the asset to be transferred to the destination chain $S_2$.
2. The validators in $S_1$ create a chain proof that the asset is properly locked, and send the chain proof to the validators in $S_2$ to register the asset in the destination chain.
3. Upon reception of a (cross-chain) chain proof, the recipient chain verifies the validity of the transfer and the correctness of the proof. If the transfer is valid according to the chain-specific policies, the asset is added on chain $S_2$, otherwise it is rejected.
4. The destination chain also creates a receipt chain-proof enclosing the result (accept, reject), and sends it to the chain $S_1$ so that the receipt is registered. If the result is "reject", the asset is unlocked in $S_1$ and the cross-chain transfer fails. If the result is "accept", the asset is permanently deleted from $S_1$.

According to an embodiment, the present invention provides a method for secure chain division of a satellite chain in a permission-based blockchain system, the method comprising:
maintaining, by an identity management component, identity information of all members of the blockchain system in a registry,
executing, among a set of validator nodes of an original satellite chain of the blockchain system, a validator assignment scheme that splits the validator nodes of the original satellite chain into subsets of validator nodes of child chains of the original satellite chain,
running, by the validator nodes of the respective subsets, a reconfiguration protocol to set up the respective child chains and sending a configuration update to the identity management component, and
recording, by the identity management component, the division of the original satellite chain and corresponding creation of the child chains.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

Throughout the figures, like reference numerals denote like components.

Figure 1:
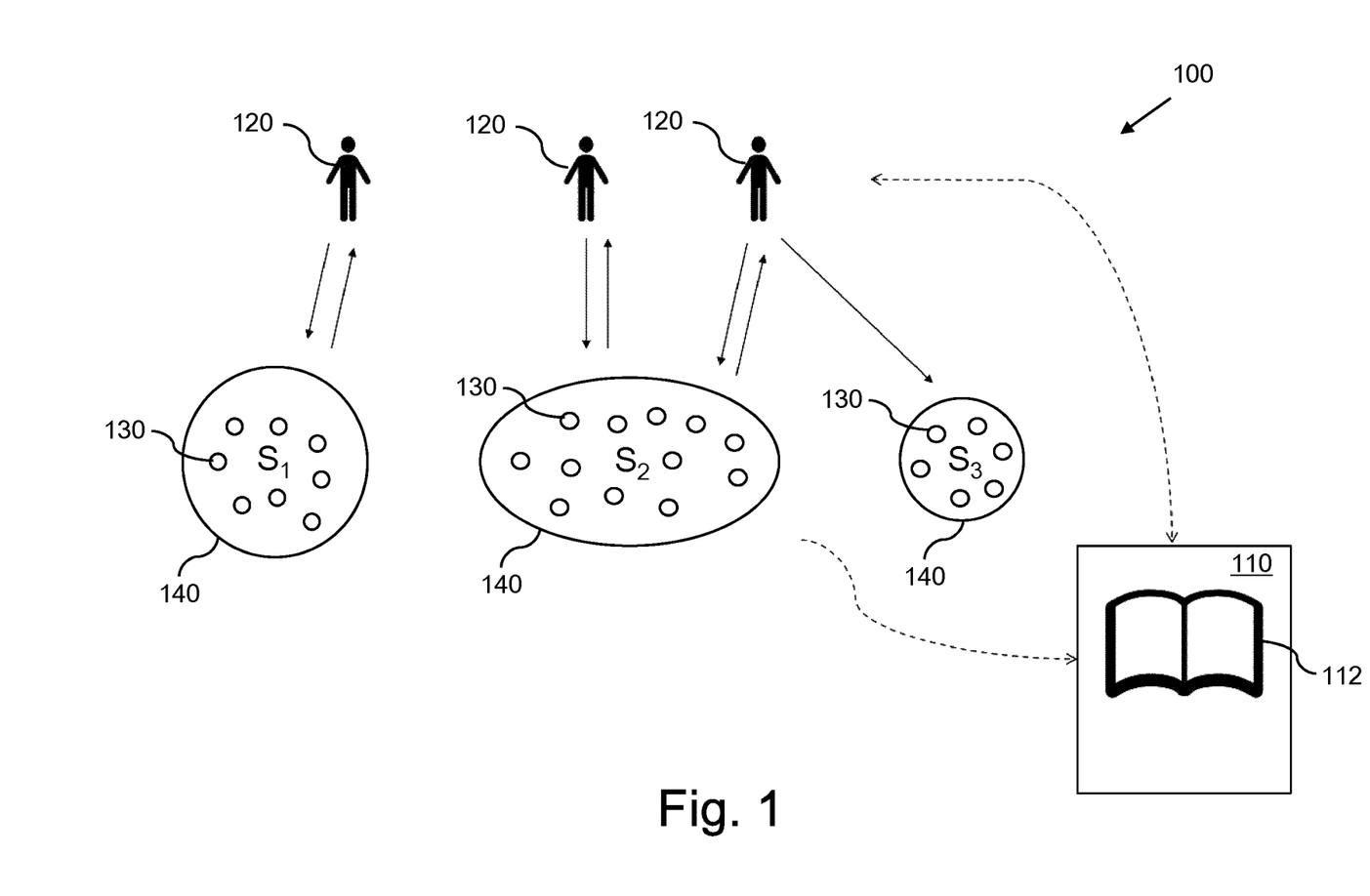
FIG. 1 is a schematic view illustrating the architecture of a blockchain system supporting satellite chains in accordance with an embodiment of the present invention.

FIG. 1 schematically illustrates the architecture and the main components of a blockchain system supporting satellite chains in accordance with an embodiment of the present invention. Generally, the invention relates to a permission-based blockchain system 100, where explicit registration is required for becoming a member of the system. To this end, the system includes an Identity Manager (IM) 110 maintaining all membership information in a dedicated registry 112. The IM 110 provides users of the blockchain system 100 with the requisite information to identify each other (e.g., through cryptographic verification keys), and may act as a discovery mechanism for new members.

Embodiment of the present invention relates to an account-based system, wherein (in contrast to UTXO-based systems), upon registering with the IM 110, a user u obtains an account $a_u$ associated to the asset that u owns, and can transfer, within the system. Users can have the following roles:

Clients 120, or regular users, who utilize the blockchain system 100 as a service providing specific functionalities (these functionalities depend on the specific use cases). For instance, clients may trade assets by issuing transactions.

Validators 130, or blockchain nodes, who are responsible for the system's governance. In particular, validators 130 verify transactions and organize them into the system's transaction ledger, which is distributed across blockchain nodes and extended through a dedicated consensus protocol. Validator nodes 130 are schematically indicated by the small circles in FIG. 1.

As will be appreciated by those skilled in the art, a user can in principle cover both roles, i.e. client 120 and validator 130, simultaneously.

As illustrated in FIG. 1, the blockchain system 100 comprises a number of various blockchains that co-exist in the form of sub-systems, dubbed satellite chains 140. Each satellite chain 140 (denoted $S_1$, $S_2$ and $S_3$ in FIG. 1) comprises a set of users $U_S$ sharing a given business logic. Among these, the validators 130 ($V_S \subseteq U_S$) have the special role of maintaining a transaction ledger $\mathcal{L}_S$ for the respective chain 140. Herein, the other users (i.e., who are not validators 130) are referred to as clients 120 of S, and the corresponding set is denoted by $C_S$.

In the context of the present disclosure, the size $|V_S|$ of the validators set is referred to as the size of chain S. Every validator node 130 ($v \subseteq V_S$) is expected to store its own local copy $\mathcal{L}_{S,v}$ of the ledger, and to participate in the consensus protocol for extending the ledger with new transactions. Each blockchain 140 can adopt its own consensus protocol regardless of the choice of other blockchains 140, i.e. each blockchain 140 can operate as an autonomous system. Different blockchains 140 can however interact with each other, e.g., to transfer assets across different chains 140. Embodiments of the present invention allow blockchains 140 to form and evolve dynamically as new members join the system 100, as will be described in more detail below.

Embodiments of the present invention support various processes within the blockchain system 100, among them the following: chain creation, joining a chain, chain division, and chain merging.

Chain Creation:

This process may require appropriate setup among validators $V_S$ to establish the configuration of blockchain S. According to a model underlying the present invention, this setup phase is abstracted away and a chain S is declared to be created by its validators 130 upon registration with the IM 110.

Joining a Chain:

This procedure is initiated by a user u in order to become a member of a blockchain S. If the user u wishes to become a client 120 of the respective chain 140, it joins by submitting a registration transaction directly to the validators 130 of the chain 140. On the other hand, if u applies as a validator 130, the request is first examined by the validators 130 against a pre-established access-control policy and, if the request is accepted, a configuration update is triggered for including u to $V_S$, leading to a more delicate reconfiguration protocol that might require interaction among the validators 130. Upon successfully updating $V_S \leftarrow V_S \cup \{u\}$, the configuration update is sent to the IM 110 and recorded in the registry 112.

Chain Division:

This procedure enables the reconfiguration of a blockchain S to generate two "child" blockchains $S_1$ and $S_2$. Concretely, a chain division triggers the partitioning of the set of validators $V_S = V_{S1} \cup V_{S2}$ so that the validators in $V_{Si}$ become members of the child chain $S_i$.

It should be noted that both joining and division processes may require a reconfiguration step to update the set(s) of validators 130 and the corresponding ledger(s). However, while joining a chain only entails adding a validator 130 to $V_S$, chain division is more delicate as it may require creating two satellite chains 140 from S.

Chain Merging:

Complementing the chain-division procedure, embodiments of the present invention also support a merging operation that creates a single set of validators V' by merging two existing validator sets $V_1$ and $V_2$. Similarly to chain division, this operation triggers a reconfiguration that replaces the two blockchain systems $S_1$ and $S_2$ with a new blockchain S'.

Hereinafter, the individual operations briefly introduced above will be described in more detail.

Chain Creation:

In an embodiment of the invention, for the creation (from scratch) of a chain S, a set of users $V_S$ is assumed, who will act as validators 130 for S, to come together and agree on the chain configuration (i.e., in particular, consensus protocol, assets distribution, genesis block, etc.). Configuration information about each chain 140 is stored into the registry 112 maintained by the IM 110, from where it can be retrieved by the participants on demand.

Specifically, when a chain 140 is created, the IM 110 may record (a subset of) the following information:

A unique identifier S for the chain 140;

A set $V_S$ of validators 130;

The specification of a (distributed) consensus protocol $\Pi_S$;

The genesis block $\mathcal{L}_S[0]$ of the transaction ledger $\mathcal{L}_S$ associated to $\Pi_S$;

(Optional) A set $C_S$ of clients 120 (where $U_S = C_S \cup V_S$ provides all users in S);

(Optional) The initial distribution of assets $A[u]_{u \in U_S}$ among users in S.

Each user $u \in U_S$ can own various assets in the system. For instance, in cryptocurrency applications, one such asset is stake in the system's currency, a fungible asset that can be transferred among stakeholders. The present invention is however not limited to these applications, and it is explicitly pointed out that virtually any type of asset can be handled. Once a blockchain S has been registered with the IM 110, the clients 120 in $C_S$ can start exchanging assets among each other by submitting transactions, and the validators 130 in $V_S$ run a consensus protocol $\Pi_S$ to organize these transactions into the system's ledger $\mathcal{L}_S$.

According to an embodiment of the invention, in order to guarantee the consistency and liveness of the ledger $\mathcal{L}_S$, the number of Byzantine nodes in $V_S$ is assumed to remain below a pre-defined threshold which depends on the consensus protocol $\Pi_S$ run among the validators 130. If $n=|V_S|$ and f is the number of Byzantine validators in S, the security condition can be expressed formally by $f < \tau n$, where $\tau \in (0,1)$ is a system-specific threshold (e.g., for classical BFT protocols it holds $\tau = 1/3$).

Joining a Chain:

According to an embodiment of the invention, to become a member of the blockchain system 100, a user u can contact the IM 110 to retrieve information about the existing blockchains 140, select a chain S among these, and register an account $a_u$ with S. The process for becoming a validator 130 is more involved, as the validators of the selected chain may enforce some access-control policy to prevent, or at least limit, malicious validators from joining the system 100.

Figure 2:
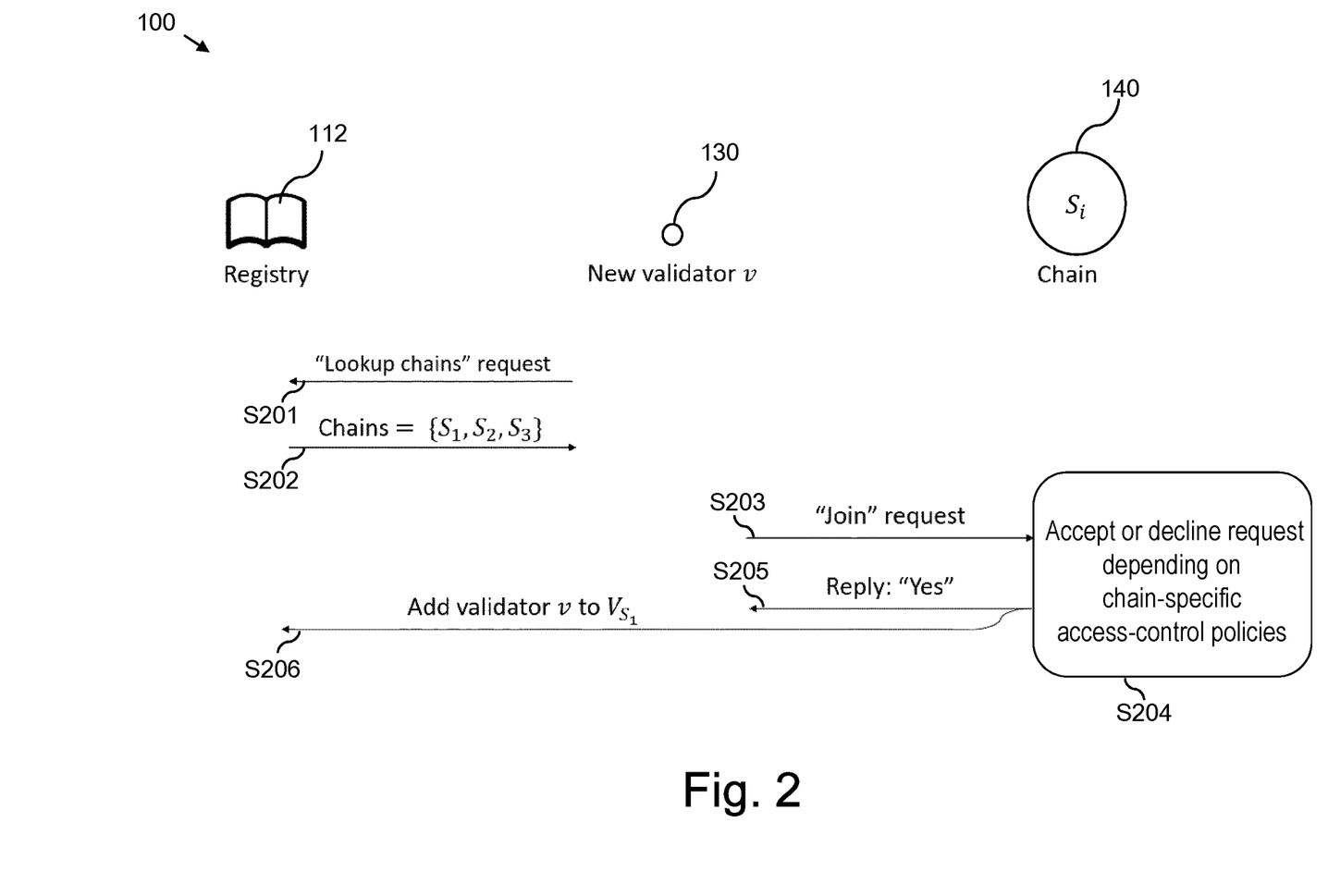
FIG. 2 is a schematic view illustrating a process of registration of validators to a blockchain system in accordance with an embodiment of the present invention.

FIG. 2 schematically illustrates a process of registration of a new validator node 130 to a chain 140 of the blockchain system 100 in accordance with an embodiment of the present invention. Accordingly, a user v who wishes to become a validator 130 can first submit a "lookup chains" request to the IM 110, as shown at S201 in FIG. 2.

The IM 110, maintaining all membership information in a dedicated registry 112, provides a discovery mechanism for v to learn about all available chains 140. In the illustrated embodiment, as shown at S202, the IM 110 answers the "lookup chains" request received from the user v by informing the user v that the chains $S_1$, $S_2$, $S_3$ are currently available in the system 100.

Provided with this information, the user v then can freely choose a particular chain S and submit a "Join" request directly to the validators 130 in $V_S$, as shown at S203.

If a sufficient number of validators 130 in $V_S$ (the number depending on chain-specific access control policies being in place) support the request, the user v is added to the validators set, i.e., $V_S \leftarrow V_S \cup \{v\}$, as shown at S204. Otherwise, the request will be declined. A corresponding reply (i.e., accepted ("yes") or declined ("no")) is transmitted to user v, as shown at $S_{204}$.

Furthermore, in order to keep the register 112 maintained by the IM 110 updated, a corresponding configuration update is sent to the IM 110, as shown at S206.

To guarantee robustness of the system 100 in the presence of Byzantine adversaries, care may be taken when granting permission to join the set of validators 130 of a given blockchain 140. Specifically, admission of new validators 130 preserves the pre-established security condition, i.e., that the number of Byzantine participants remains below the respective tolerated threshold. Therefore, a dedicated access-control mechanism may be adopted, as otherwise an attacker could increase the number of Byzantine participants and take over an entire blockchain. Such access-control mechanism falls outside the scope of the present invention.

Chain Division:

As new validators 130 join the system 100, the size of a chain 140 may grow indefinitely. Due to the inherently limited scalability of permission-based consensus protocols, eventually set $V_S$ may become "too large" and significantly degrade the performance of chain S. Embodiments of the present invention provide a solution to this problem. The idea is based on the principle to slim down a large chain S by splitting it into two subsystems $S_1$ and $S_2$, in analogy with the biological process of cell division that creates two child cells from a parent cell. In an embodiment, the splitting may be performed in such a way that $|V_{S_1}| \approx |V_{S_2}| \approx |V_S|/2$.

Figure 3:
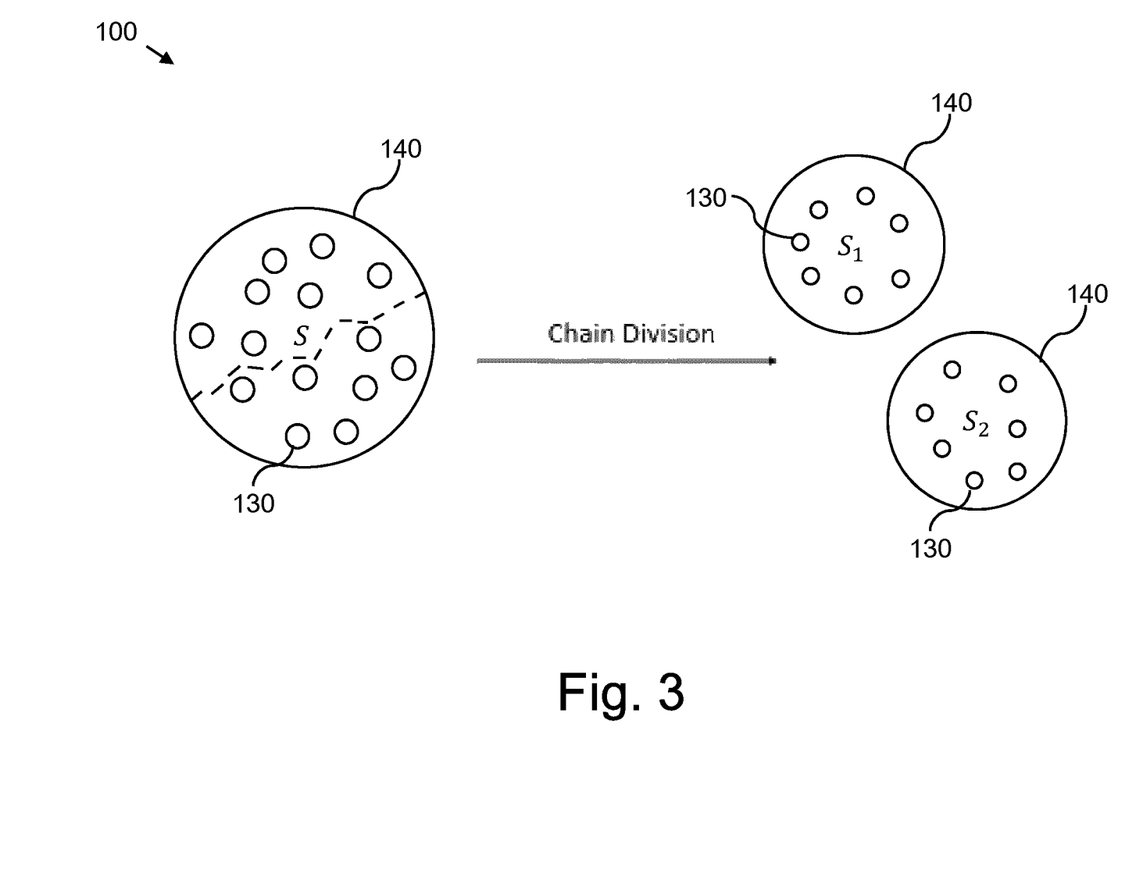
FIG. 3 is a schematic view illustrating a process of chain division in a blockchain system in accordance with an embodiment of the present invention.

FIG. 3 is a high level illustration of the chain-division process according to an embodiment of the invention.

According to embodiments of the invention, a chain-division process may be triggered by various events, depending on the use-case and/or specific blockchain implementation. For instance, the system 100 could be set to support a maximum chain size m: in this case, a chain division may be requested as soon as a chain S of the blockchain system 100 reaches the pre-established maximum size $|V_S| \geq m$.

According to an alternative embodiment, it may be provided that the system monitors the transaction throughput of each satellite chain 140 and triggers a chain division in case the measures show a significant (and long-lasting, i.e. longer than a predefined time period) throughput drop (i.e. exceeding a predefined threshold). In this regard, the invention is not restricted in any way. As such, in general terms, the system includes an implicit, application-specific mechanism that triggers the chain-division process. The trigger mechanism may also include notifying all involved validators 130.

According to embodiments of the invention, the chain-division process may include execution of a validator assignment scheme and a reconfiguration protocol. Let S be the original satellite chain 140. The validator assignment scheme is configured to split set $V_S$, i.e. the validators 130 of the original satellite chain 140, into $V_{S1}$ and $V_{S2}$, i.e. the validators 130 for the child systems. The reconfiguration protocol is configured to replace the original chain S with the new chains $S_1$ and $S_2$, making sure that the child chains are initialized consistently with the parent chain.

According to an embodiment, the validator assignment scheme may define a strategy to split $V_S$, the set of validators 130 of the original chain S, into $V_{S1}$ and $V_{S2}$, the sets of validators 130 of the child chains $S_1$ and $S_2$. For instance, in order to achieve optimal performance, it may be provided to assign half of the validators 130 in S to child chain St, and the remaining validators 130 to $S_2$.

Additionally or alternatively, the validator assignment scheme may consider security aspects. For example, for security purposes, the validator assignment scheme may aim at assigning validators 130 so that no child chain $S_i$ contains more Byzantine nodes than the maximum tolerated fraction depending on the consensus protocol being used, i.e., $f_i < \tau n_i$. In this context, an adaptive attacker may exploit the division of a chain 140 as an opportunity to take over one of the child chains by concentrating all the Byzantine validators either in $S_1$ or $S_2$.

According to an embodiment of the invention, the assignment of validator nodes 130 to the child chains may be performed in a deterministic way. In this context, it has been recognized that the aforementioned attack can be prevented by enforcing a (compared to the tolerance of the consensus protocol) more conservative bound on the fraction of tolerated Byzantine participants in S. Namely, if the consensus protocol $\Pi_S$ underlying chain S can tolerate up to $\tau n$ Byzantine nodes, the validator assignment scheme may enforce a stricter bound (e.g. $\tau n/2$) of Byzantine nodes in S. For instance, if $\Pi_S$ is a classical BFT protocol, it may be provided to enforce $f < n/6$ instead of $f < n/3$. This stronger requirement ensures the security of both child systems regardless of how the validators 130 are assigned to $S_1$ and $S_2$, i.e., independently of the assignment scheme. In this case, a simple assignment scheme could be to deterministically rank validators in S according to some criterion (e.g., following the lexicographic order of the validator's identifiers), to assign the first $n/2$ validators 130 in the ranking to $S_1$, and the other validators 130 to $S_2$.

According to an alternative embodiment of the invention, the assignment of validator nodes 130 to the child chains may be performed in a randomized way. In other words, assigning validators 130 to the child systems could leverage randomization to distribute the Byzantine nodes, ensuring that the ratio between Byzantine validators and honest validators in all chains is roughly preserved, i.e., $f_1/n_1 \approx f_2/n_2 \approx f/n$, with high probability. Using randomization makes the assignment scheme slightly more complex, however, it permits tolerating a higher number of Byzantine validators, namely $f < \tau n/2 + s$ with $0 \leq s \leq \tau n/2$, while ensuring probabilistic security guarantees.

In a classical BFT system (i.e., $\tau=\frac{1}{3}$), a deterministic assignment strategy as above can tolerate at most n/6 Byzantine nodes, while a randomized assignment could tolerate more Byzantine failures, namely n/6+s with 0≤s≤n/6. Clearly, s=0 provides the most conservative bound, which corresponds to the highest possible security (i.e., both systems $S_1$ and $S_2$ are guaranteed to remain secure with probability 1). If s>0, i.e., more than n/6 nodes in S are Byzantine, the security guarantees for the child systems gracefully degrade, in the sense higher values of s decrease the probability of preserving security in both child systems. For instance, if S contains f=n/4 (=n/6+n/12) Byzantine nodes, there is a small chance of violating the security bound in either of the child chains, and the probability of preserving security in both chains gracefully decreases with s.

Crucially, the scheme may prevent Byzantine nodes from biasing the randomness used in order to prevent the attacker from influencing the selection of validators. Therefore, in an embodiment, the present invention provides a robust assignment scheme that ranks validators based on publicly available randomness extracted from the blockchain, e.g., by cryptographically hashing each validators' identifier with recent blockchain content.

Once the assignment of validators 130 to the child systems $S_1$ and $S_2$ has been established, the validator nodes 130 in $V_{Si}$ run a reconfiguration protocol to set up the respective child chains $S_1$ and $S_2$. This step of setting up a new satellite chain $S_i$ executed by the validators 130 in $V_{Si}$ is similar to the creation of a new chain "from scratch" as described above, with the exception that both systems $S_1$ and $S_2$ may be consistent with the state of their parent system S. Namely, the state of each child system $S_1$ is fully described by its ledger $\mathcal{L}_{Si}$, and the latter reproduces any asset information A[v] registered in $\mathcal{L}_S$, for all validators $v \in V_{Si}$. It should be noted that, to ensure consistency of the child ledgers with the parent ledger, all (honest) validators 130 should agree on the state of ledger $\mathcal{L}_S$ prior to initiating the reconfiguration protocol.

Concretely, according to an embodiment of the invention, each child system $S_i$ may specify the following information:
A unique identifier $S_i$ for the chain;
A validator set $V_{Si}$;
The underlying consensus protocol $\Pi_{Si}$;
The history of transactions registered in $\mathcal{L}_S$ or, alternatively, a genesis block $\mathcal{L}_{Si}[0]$ summarizing the transaction history consistently with $\mathcal{L}_S$;
The distribution of assets $A[v]_{v \in V_{Si}}$ as specified by $\mathcal{L}_S$;

According to an embodiment, once both satellite chains $S_1$ and $S_2$ have been initialized as described above, the corresponding validators 130 may send a configuration-update request to the IM 110, and the latter may record the division of satellite chain S and corresponding creation of chains $S_1$ and $S_2$ in the registry 112. Upon completion of this step, the newly created chains can start operating. From this moment on, they proceed autonomously and independently of each other.

Chain Merging:

Under dynamic participation, new validators may join existing blockchains and old validators may leave. To deal with the case of satellite chains shrinking in size due to their validators leaving the system, embodiments of the present invention additionally support a merging operation that allows the creation of a single blockchain S' out of two (small) blockchains $S_1$ and $S_2$.

According to an embodiment of the invention, chain merging may be triggered by the validators 130 of two satellite chains $S_1$ and $S_2$, when the corresponding sets $V_1$ and $V_2$ shrink (e.g. below a configurable threshold). The validators 130 of the two chains may agree on joining a single chain using some external discovery mechanism. For instance, if the chain size of all satellite chains 140 is indicated in the registry 112 of the IM 110, they could simply "find each other" by looking up in the registry 112. To merge the two blockchains, the validators 130 come together and establish a new set $V'=V_1 \cup V_2$, select a unique identifier S' for the new chain, and set a new ledger $\mathcal{L}_{S'}$, which is consistent with $\mathcal{L}_{S1}$ and $\mathcal{L}_{S2}$. The new ledger $\mathcal{L}_{S'}$ may be set up by reproducing the assets owned by the clients of the two old chains into the newly created chain. Finally, the validators 130 of the new satellite chain S' send a configuration update to the IM 110 to record in the register 112 the new blockchain S' as replacing systems $S_1$ and $S_2$.

Embodiments of the present invention find natural application in the context of blockchain interoperability. Securely dividing (original) satellite chains into (child) satellite chains in accordance with embodiments of the present invention enables the creation of multiple satellite chains 140 that operate autonomously and can as well communicate with all other chains in the blockchain system 100.

The smart contract layer of a satellite chain provides clients with various functionalities, such as retrieving information about other clients and transferring assets from an account to another. According to embodiments of the present invention, these functionalities may be extended to the whole system of satellite chains 140, through dedicated cross-chain communication protocols, as exemplary shown in FIG. 4 for a cross-chain asset transfer between two satellite chains 140. Asset transfers, where a client 120 requests the transfer of some assets it owns from its own account to some other account of its choice, are certainly the most widely-used blockchain functionality.

Figure 4:
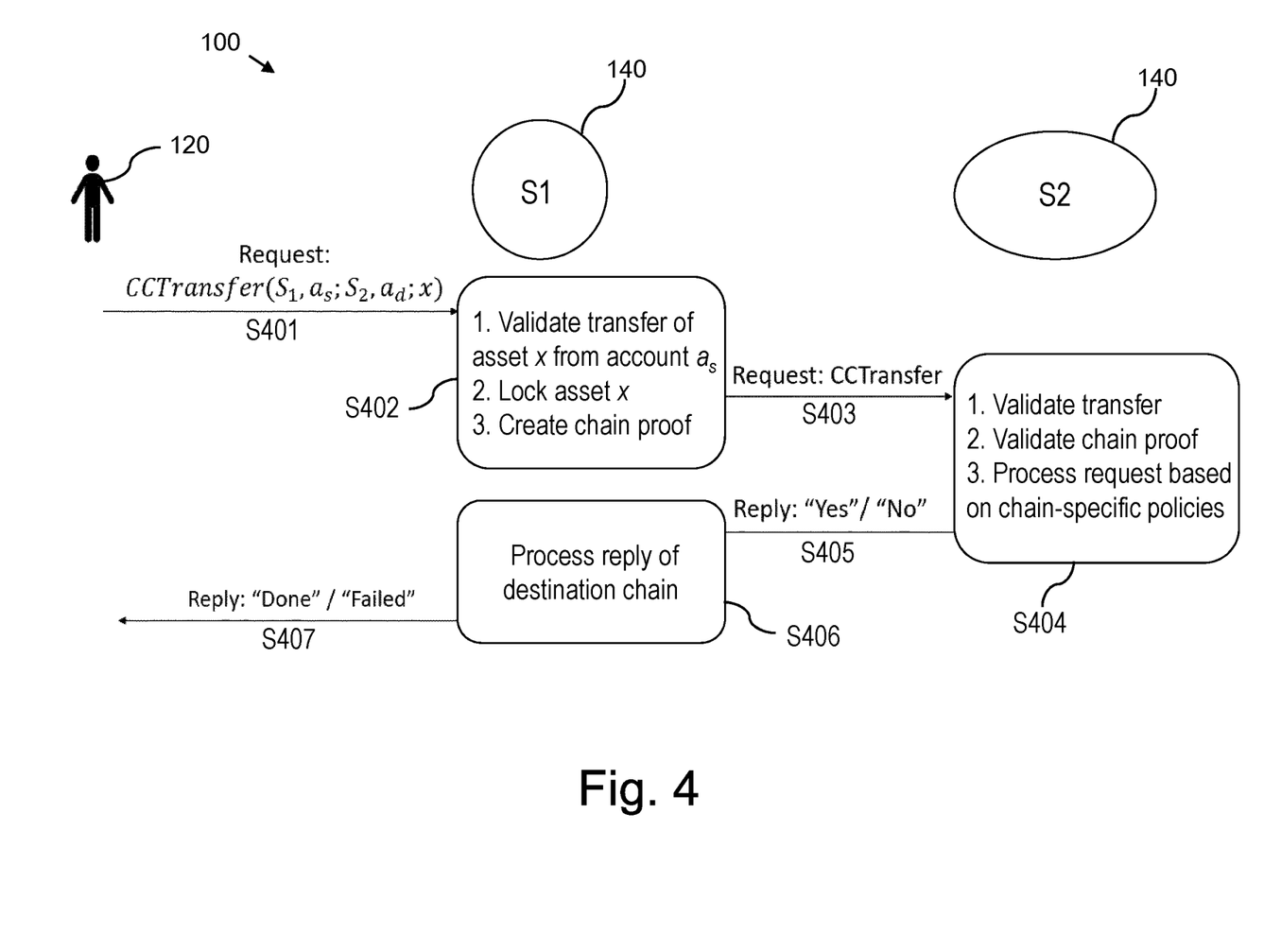
FIG. 4 is a schematic view illustrating a cross-chain asset transfer as a functionality of satellite chains in a blockchain system in accordance with an embodiment of the present invention.

Before turning to FIG. 4, a typical asset transfer operated within a single blockchain will be briefly described. Such in-chain asset transfer is initiated by a client issuing a transaction TX to transfer assets from its own account $a_s$ (source account) to some other account $a_d$ (destination account), with $u_s, u_d \in C_S$ (using the above notation). As soon as the transaction is committed to the ledger (i.e., it is confirmed), the asset indicated in TX is (virtually) moved from $a_s$ to $a_d$ and the transfer terminates successfully. Otherwise, no asset is transferred (because the transfer either never took place or failed).

Next, the extension of asset transfers to the case of cross-chain communication (i.e. cross-chain asset transfers) according to embodiments of the present invention will be described with reference to FIG. 4. This type of transfer aims at moving assets from an account $a_s \in S$ to an account $a_d \in S'$, i.e., across different satellite chains S and S'. It is more delicate than a standard in-chain asset transfer and may require interactions between satellite chains 140.

As illustrated in FIG. 4, the cross chain asset transfer from a source satellite chain $S_1$ to a destination satellite chain $S_2$ starts by a client 120 transmitting a respective cross-chain transfer request (S401). The request includes the identifiers $S_1$ and $S_2$ of the two satellite chains, the source and destination accounts $a_s$, $a_d$ and the asset x to be transferred.

As shown at S402, upon reception of the cross-chain transfer request, the validators of the source chain $S_1$ validate the transfer of asset x from account $a_s$ and lock the asset x to be transferred to the destination chain $S_2$. Furthermore, the validators in $S_1$ create a chain proof that the asset x is properly locked.

As shown at S403, the validator nodes in $S_1$ send the chain proof to the validators in $S_2$ to register the asset x in the destination chain $S_2$.

As shown at S404, upon reception of a (cross-chain) chain proof, the validators of the recipient chain $S_2$ verify the validity of the transfer and the correctness of the proof. If the transfer is valid according to the chain-specific policies, the asset x is added on chain $S_2$, otherwise it is rejected.

The destination chain $S_2$ also creates a receipt chain-proof (as shown at S405), including the result (i.e., accept ("yes") or reject ("no")), and sends it to the source chain $S_1$ so that the receipt is registered. As shown at S406, if the result is "reject", the asset x is unlocked in $S_1$ and the cross-chain transfer fails. On the other hand, if the result is "accept", the asset x is permanently deleted from St.

Finally, as shown at S407, the result is reported back to the client 120.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for secure chain division of a satellite chain by a validator node of a permission-based blockchain system, the method comprising:
    enforcing, prior to the chain division, a more conservative bound on a fraction of tolerated Byzantine nodes in an original satellite chain of the blockchain system than tolerated by an underlying Byzantine fault tolerance (BFT) consensus protocol;
    executing, by communicating with a set of validator nodes of the original satellite chain, a validator assignment scheme that splits the set of validator nodes of the original satellite chain into subsets of validator nodes of child chains of the original satellite chain;
    assigning, by the validator assignment scheme, the subsets of the validator nodes to the child chains in a deterministic way such that each of the child chains does not contain more of the Byzantine nodes than a maximum fraction tolerated by the underlying BFT consensus protocol, wherein the Byzantine nodes are prevented from influencing randomness used by the validator assignment scheme by ranking the validator nodes based on publicly available randomness extracted from the blockchain system and by assigning the validator nodes to the child chains based on their ranking; and
    running, by communicating with the validator nodes of the respective subsets, a reconfiguration protocol to set up the respective child chains, and sending, to an identity management component that maintains identity information of all members of the blockchain system in a registry, a configuration update to record the division of the original satellite chain and corresponding creation of the child chains.

2. The method according to claim 1, further comprising:
    once the assignment of validators has been established, initializing the child chains by achieving an agreement among the respective validators of each of the child chains on a state of a ledger of the original satellite chain.

3. The method according to claim 1, further comprising:
    establishing conditions and/or events that trigger a chain division process, and initiating the chain division process upon observing occurrence of an established condition and/or event.

4. The method according to claim 1, wherein a chain division process of the original satellite chain is triggered when the original satellite chain reaches a predefined maximum chain size.

5. The method according to claim 1, further comprising:
    monitoring a transaction throughout of each of the satellite chains; and
    triggering a chain division process when the monitored transaction throughout drops below a predefined throughout performance threshold.

6. The method according to claim 1, further comprising triggering of a chain division process and notifying all involved validator nodes of the chain division.

7. A validator node of a permission-based blockchain system, comprising a processor and a memory, the memory comprising processor executable instructions that, when executed by the processor, cause the processor to perform the following operations for secure chain division of a satellite chain in the blockchain system:
    enforcing, prior to the chain division, a more conservative bound on a fraction of tolerated Byzantine nodes in an original satellite chain of the blockchain system than tolerated by an underlying Byzantine fault tolerance (BFT) consensus protocol;
    executing, by communicating with a set of validator nodes of the original satellite chain, a validator assignment scheme that splits the validator nodes of the original satellite chain into subsets of validator nodes of child chains of the original satellite chain;
    assigning, by the validator assignment scheme, the subsets of the validator nodes to the child chains in a deterministic way such that each of the child chains does not contain more of the Byzantine nodes than a maximum fraction tolerated by the underlying BFT consensus protocol, wherein the Byzantine nodes are prevented from influencing randomness used by the validator assignment scheme by ranking the validator nodes based on publicly available randomness extracted from the blockchain system and by assigning the validator nodes to the child chains based on their ranking; and running, by communicating with the validator nodes of the respective subsets, a reconfiguration protocol to set up the respective child chains and sending, to an identity management component that maintains identity information of all members of the blockchain system in a registry, a configuration update to record the division of the original satellite chain and corresponding creation of the child chains.

8. The validator node according to claim 7, further configured to:

initialize, once the assignment of validator nodes has been established, the child chains by achieving an agreement among the respective validator nodes of each of the child chains on a state of the ledger of the original satellite chain.

9. The validator node according to claim 7, further configured to:

establish conditions and/or events that trigger a chain division process, and initiate the chain division process upon observing occurrence of an established condition and/or event.

10. A non-transitory computer readable medium comprising processor executable instructions that, when executed by a processor, cause the processor to perform the following operations for secure chain division of a satellite chain in a blockchain system:

enforcing, prior to the chain division, a more conservative bound on a fraction of tolerated Byzantine nodes in an original satellite chain of the blockchain system than tolerated by an underlying Byzantine fault tolerance (BFT) consensus protocol;

executing, by communicating with a set of validator nodes of the original satellite chain, a validator assignment scheme that splits the validator nodes of the original satellite chain into subsets of validator nodes of child chains of the original satellite chain;

assigning, by the validator assignment scheme, the subsets of the validator nodes to the child chains in a deterministic way such that each of the child chains does not contain more of the Byzantine nodes than a maximum fraction tolerated by the underlying BFT consensus protocol, wherein the Byzantine nodes are prevented from influencing randomness used by the validator assignment scheme by ranking the validator nodes based on publicly available randomness extracted from the blockchain system and by assigning the validator nodes to the child chains based on their ranking; and running, by communicating with the validator nodes of the respective subsets, a reconfiguration protocol to set up the respective child chains and sending, to an identity management component that maintains identity information of all members of the blockchain system in a registry, a configuration update to record the division of the original satellite chain and corresponding creation of the child chains.

\* \* \* \* \*